United States Patent
Wang et al.

(10) Patent No.: US 7,428,561 B2
(45) Date of Patent: Sep. 23, 2008

(54) APPARATUS AND METHOD FOR SCALING DIGITAL DATA INFORMATION

(75) Inventors: Denzel Wang, Taipei (TW); An-Te Chiu, Taipei (TW); Sheng-Che Tsao, Taipei (TW)

(73) Assignee: VIA Technologies, Inc., Taipei (TW)

( * ) Notice: Subject to any disclaimer, the term of this patent is extended or adjusted under 35 U.S.C. 154(b) by 692 days.

(21) Appl. No.: 10/891,033

(22) Filed: Jul. 15, 2004

(65) Prior Publication Data
US 2005/0210087 A1 Sep. 22, 2005

(30) Foreign Application Priority Data
Mar. 19, 2004 (TW) .............................. 93107533 A

(51) Int. Cl.
*G06F 7/00* (2006.01)
(52) U.S. Cl. .................................................. 708/208

(58) Field of Classification Search ................ 708/208
See application file for complete search history.

(56) References Cited

U.S. PATENT DOCUMENTS

| 4,807,171 | A | * | 2/1989 | Gale ........................... 708/200 |
| 5,237,432 | A | * | 8/1993 | Calarco et al. .............. 358/451 |
| 6,674,551 | B1 |  | 1/2004 | Takura et al. |
| 6,714,210 | B1 | * | 3/2004 | Yip et al. ..................... 345/667 |
| 2003/0031375 | A1 | * | 2/2003 | Enomoto .................... 382/255 |

* cited by examiner

*Primary Examiner*—Tan V Mai
(74) *Attorney, Agent, or Firm*—Birch, Stewart, Kolasch & Birch, LLP

(57) ABSTRACT

A data processing apparatus for scaling a digital data source is provided. The data processing apparatus includes a ratio transformation module and a scaling module. The ratio transformation module receives a ratio signal and generates a Look-up Table (LUT). The scaling module connected to the ratio transformation module receives the digital data source, scales the digital data source based on the LUT, and then outputs a processed digital data.

20 Claims, 8 Drawing Sheets

APPARATUS AND METHOD FOR SCALING DIGITAL DATA INFORMATION

BACKGROUND OF THE INVENTION

1. Field of the Invention

This invention relates to a method and an apparatus for scaling digital data. Specifically, it relates to a method and an apparatus for magnifying and minifying a digital image.

2. Description of the Related Art

The break through computer technologies in recent years has flooded our everyday life with numerous amount of information and we lead a life style surrounded with digital technologies. For example, the digital camera is more and more popular, and the digital data is easy to be operated than the analog data. Therefore, everyone likes to modify their own picture on PC. However, quality and size of the pictures are usually restricted by the apparatus or device capturing the digital image. Consequently, it is used to scale the digital image by image processing technologies for high quality, proper size, or satisfied dpi of a digital image.

SUMMARY OF THE INVENTION

This invention provides a data processing apparatus for scaling a first digital data. The data processing apparatus comprises a ratio transformation module for receiving a ratio signal and generating a Look-up Table (LUT) based on the ratio signal; and a scaling module connected to the ratio transformation module for receiving and scaling the first digital data based on the LUT, and outputting a second digital data.

This invention also provides a data processing method for scaling a first digital data. The method comprises receiving a ratio signal and generating a Look-up Table (LUT) based on the ratio signal; and receiving and scaling the first digital data based on the LUT, and outputting a second digital data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

A preferred embodiment is given as following to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore the present invention is not intended to be limited to the particular embodiments shown and described herein, but is to be accorded the widest herein disclosed.

In one aspect, the present invention is directed to provide a data processing apparatus for receiving a first digital data and scaling the first digital data according to a ratio signal.

In another aspect, the present invention is directed to provide a data processing method for receiving a first digital data and scaling the first digital data according to a ratio signal.

Figure 1:
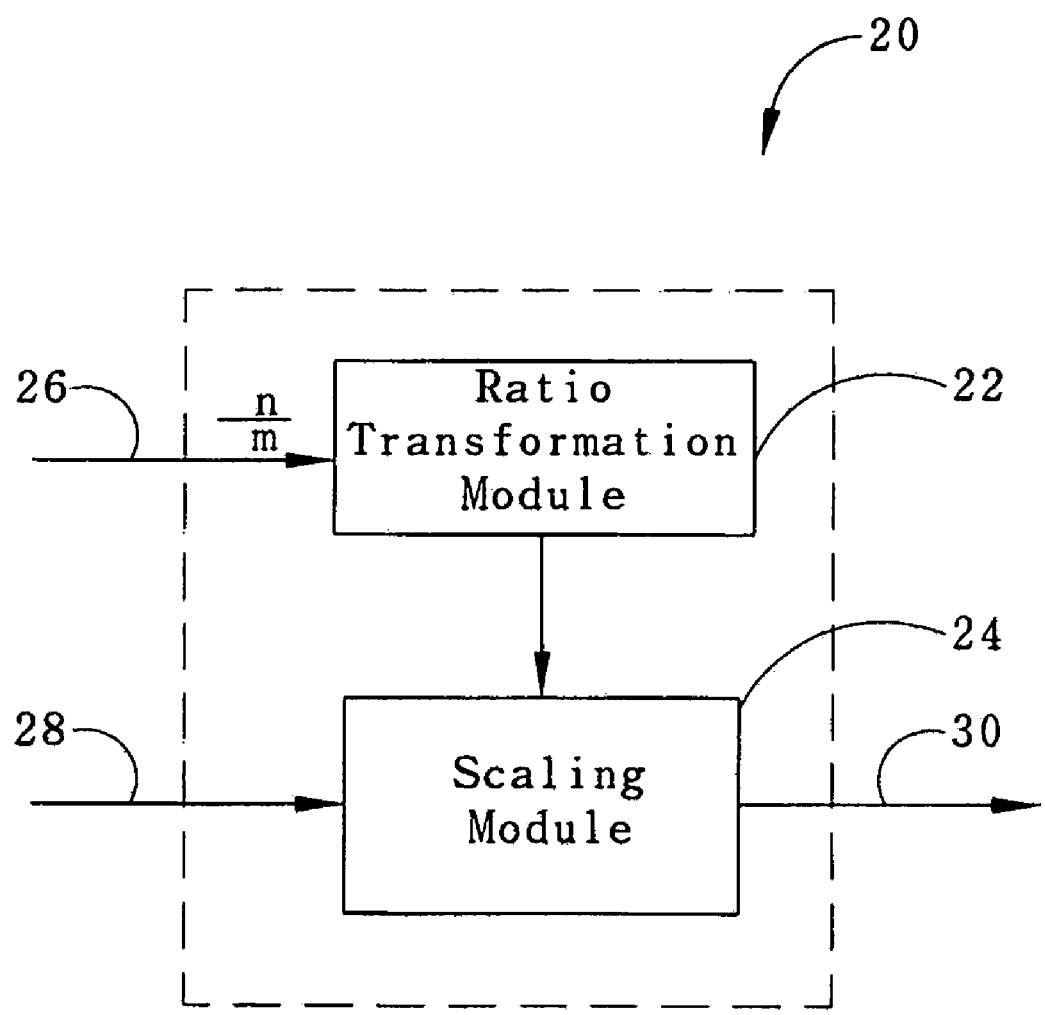
FIG. 1 is a block diagram of data processing apparatus according to this invention.
Figure 2:
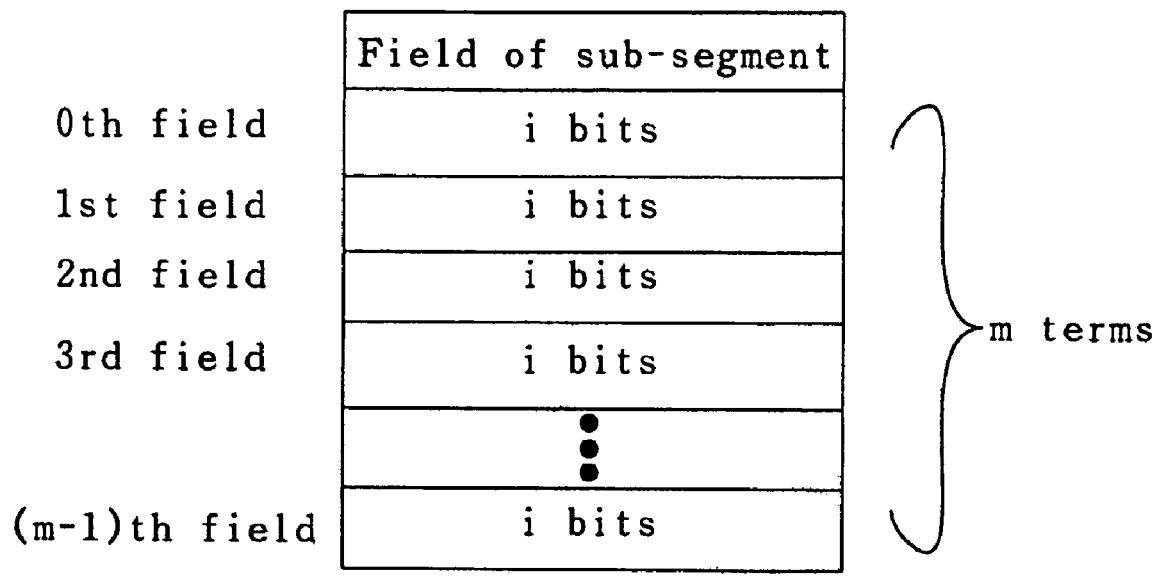
FIG. 2 is a Look-Up Table (LUT) in the ratio transformation module shown in FIG. 1.

Referring to FIG. 1 and FIG. 2, FIG. 1 is a block diagram of data processing apparatus according to this invention, and FIG. 2 is a Look-Up Table (LUT) in the ratio transformation module shown in FIG. 1. The ratio transformation module 22 receives the ratio signal 26 and generates a Look-up Table (LUT) based on the ratio signal 26. The scaling module 24 connected to the ratio transformation module 22 for receiving and scaling the first digital data 28 based on the LUT, and outputting a second digital data 30.

The ratio signal 26 shown in FIG. 1 comprises information about the scaling ratio of $$\frac{n}{m}$$

and the ratio transformation module 22 generates a Look-up Table based on $$\frac{n}{m}$$

when receiving the ratio signal 26 and obtaining the scaling ratio $$\frac{n}{m}.$$

As shown in FIG. 2, the LUT comprises m fields of sub-segment ($0^{th}$ field of sub-segment, $1_{st}$ field of sub-segment ... $(m-1)^{th}$ field of sub-segment), wherein each field of sub-segment comprises i bits for binary number, for example, binary number 10 represents decimal number 2. The ratio transformation module 22 uses inverse of the ratio, $$\frac{m}{n},$$

to accumulate from zero, make an arithmetic sequence comprises $$0, \frac{m}{n}, \frac{2m}{n}, \frac{3m}{n}, \frac{4m}{n}, \ldots, \frac{(n-2)m}{n} \text{ and } \frac{(n-1)m}{n},$$

totally n terms. Then the ratio transformation module 22 takes round down operation on each term, counts the number of times each integer appears and records the frequency each integer appears in binary in the corresponding field of sub-segment.

Figure 3:
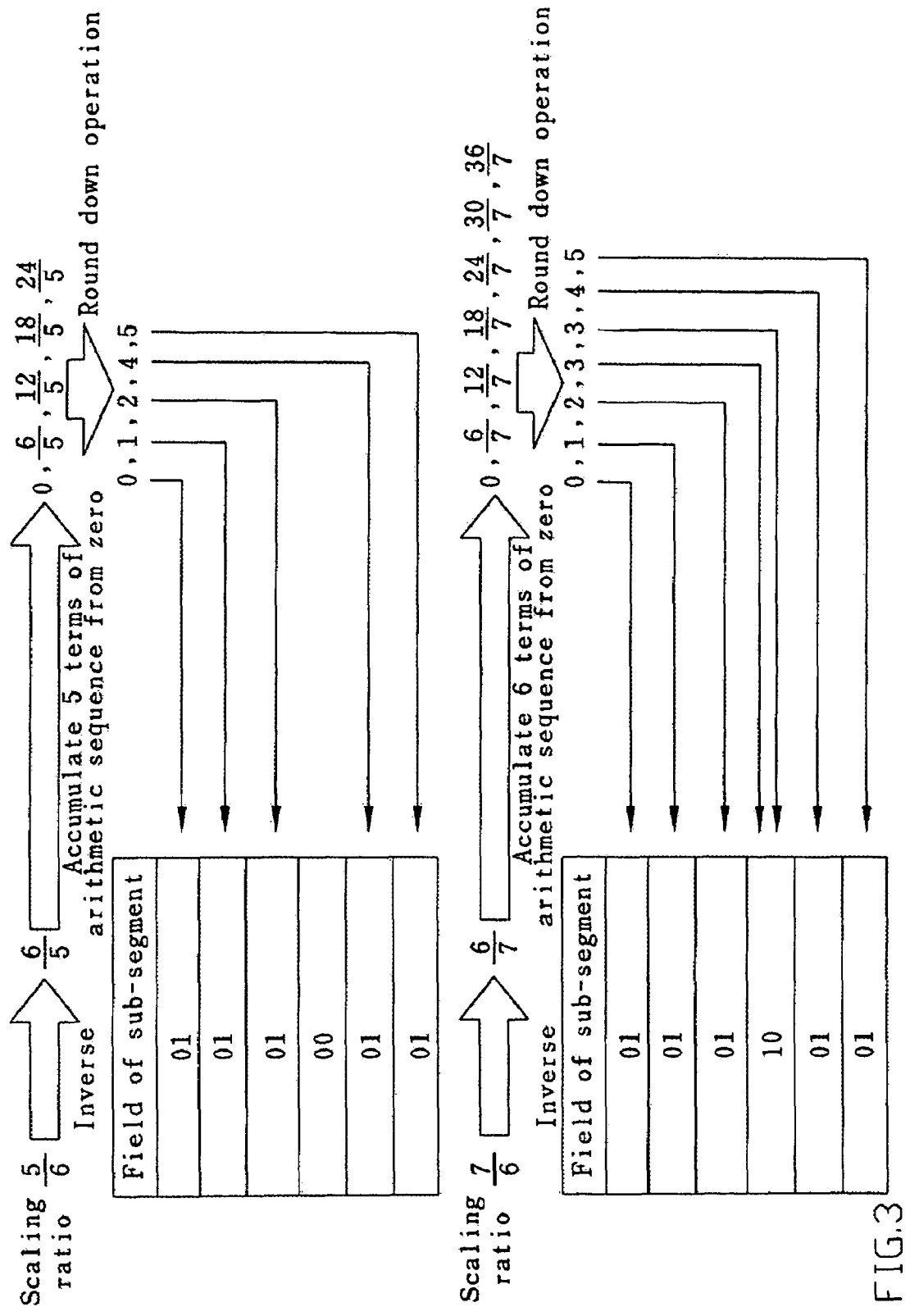
FIG. 3 is a schematic diagram of generating the LUT.

Referring to FIG. 3, it is a schematic diagram of generating the LUT. When information of the scaling ratio of the ratio signal 26 is $$\frac{5}{6},$$

for example, received by the ratio transformation module 22, a LUT comprising six fields of sub-segment ($0^{th}$ field of sub-segment, $1^{st}$ field of sub-segment, . . . , $5^{th}$ field of sub-segment) will be generated by the ratio transformation module 22 in accordance with the scaling ratio $$\frac{5}{6}.$$

One embodiment is that the ratio transformation module 22 uses inverse of the scaling ratio, $$\frac{6}{5},$$

to accumulate from zero, make an arithmetic sequence comprises $$0, \frac{6}{5}, \frac{12}{5}, \frac{18}{5} \text{ and } \frac{24}{5},$$

totally 5 terms. Then the ratio transformation module 22 takes round down operation on each term, the sequence changes to 0, 1, 2, 4, and 5. According to value of the number corresponding to the field of sub-segment and counts of appearance of the number, we can get the content of field of the sub-segment. For example, the number 0 in the sequence presents one time, so the ratio transformation module 22 records 01 in $0^{th}$ field of sub-segment, the number 1 in the sequence presents one time, so the ratio transformation module 22 records 01 in $1^{st}$ field of sub-segment, and so on. However, there is no number 3 in the sequence, the ratio transformation module 22 records 00 in $3^{rd}$ field of sub-segment thereof. By doing so, the LUT is generated by the ratio transformation module 22, which is corresponding to the scaling ratio $$\frac{5}{6}.$$

In another embodiment, when information of the scaling ratio of the ratio signal 26 is $$\frac{7}{6}$$

received by the ratio transformation module 22, a LUT comprising six fields of sub-segment ($0^{th}$ field of sub-segment, $1^{st}$ field of sub-segment, . . . , $5^{th}$ field of sub-segment) will be generated by the ratio transformation module 22 in accordance with the scaling ratio $$\frac{7}{6}.$$

The ratio transformation module 22 uses inverse of the scaling ratio, $$\frac{6}{7},$$

to accumulate from zero, make an arithmetic sequence comprises $$0, \frac{6}{7}, \frac{12}{7}, \frac{18}{7}, \frac{24}{7} \text{ and } \frac{36}{7},$$

totally 7 terms. Then the ratio transformation module 22 takes round down operation on each term, the sequence changes 0, 1, 2, 3, 3 and 4. According to value of the number corresponding to the field of sub-segment and counts of appearance of the number, we can get the content of field of the sub-segment. For instance, the number 0 in the sequence presents one time, so the ratio transformation module 22 records 01 in $0^{th}$ field of sub-segment, the number 1 in the sequence presents one time, so the ratio transformation module 22 records 01 in $1^{st}$ field of sub-segment, and so on. However, the number 3 presents twice in the sequence, the ratio transformation module 22 records 10 in $3^{rd}$ field of sub-segment thereof. By doing so, the LUT is generated by the ratio transformation module 22, which is corresponding to the scaling ratio $$\frac{7}{6}.$$

Due to few times of presentation of the number in the sequence, all contents of the LUTs mentioned above are 2 bits. However, the ratio transformation module 22 will give sufficient bits for recording considering the maximum of times of presentation among these numbers. For instance, the scaling ratio is $$\frac{13}{3},$$

inverse of the scaling ratio is $$\frac{3}{13},$$

and an arithmetic sequence is $$0, \frac{3}{13}, \frac{6}{13}, \frac{9}{13}, \frac{12}{13}, \frac{15}{13}, \frac{18}{13}, \frac{21}{13}, \frac{24}{13}, \frac{27}{13}, \frac{30}{13}, \frac{33}{13} \text{ and } \frac{36}{13}.$$

After round down, the sequence changes to 0, 0, 0, 1, 1, 1, 1, 2, 2, 2, 2, 3 and 3, wherein the number 1 and 2 in the sequence present four times respectively, the contents in $1^{st}$ field of sub-segment and $2^{nd}$ field of sub-segment are 100 thereof.

Figure 4:
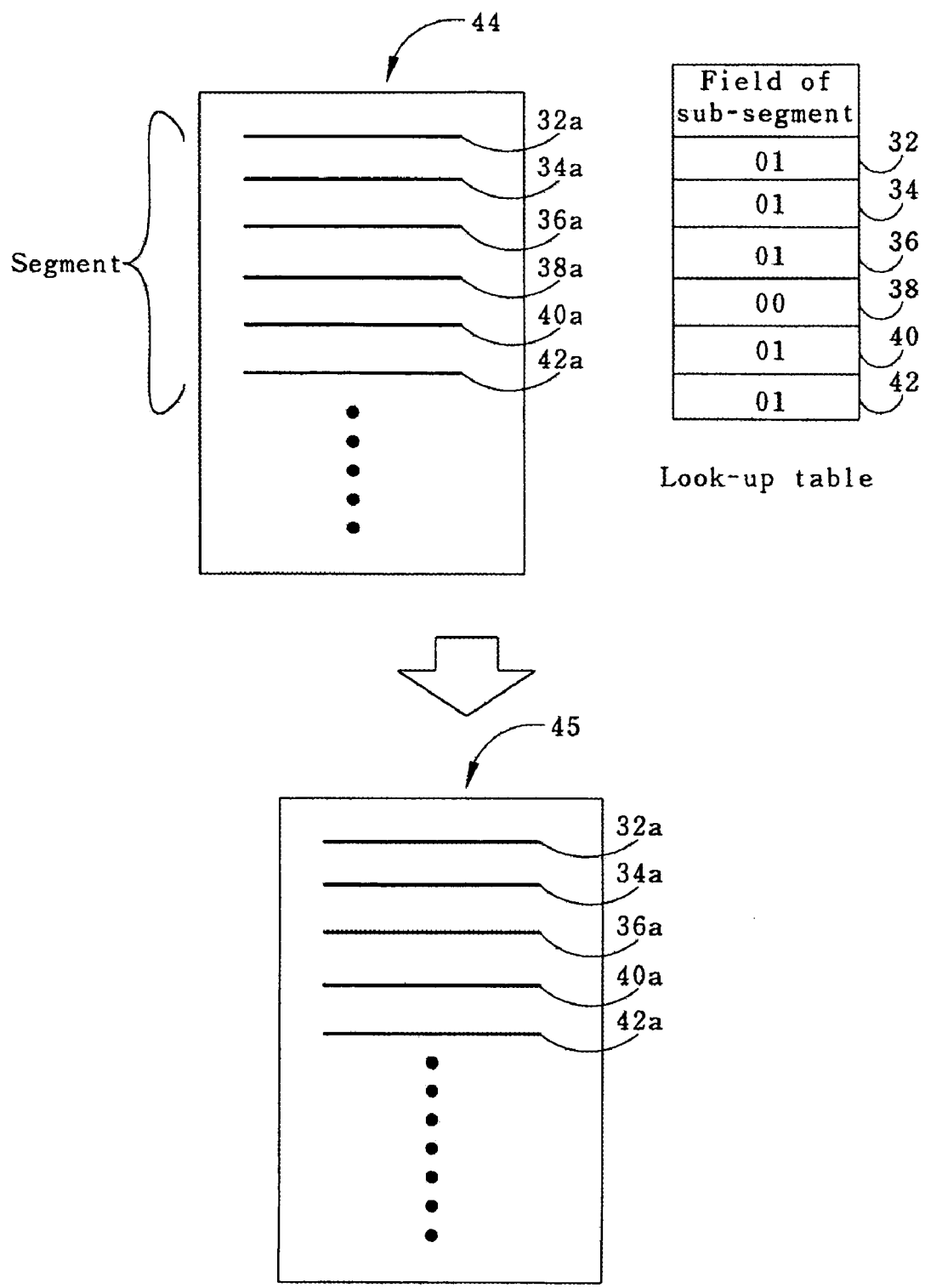
FIG. 4 is a schematic diagram of minifying an image.

Referring to FIG. 4, it is a schematic diagram of minifying an image. When information of the scaling ratio of the ratio signal 26 is $$\frac{5}{6}$$

received by the ratio transformation module 22, the LUT generated in accordance with the scaling ratio and stored in the ratio transformation module 22. The process was described as above, therefore no longer gives unnecessary detail in this. The LUT comprises six fields of sub-segments 32, 34, 36, 38, 40 and 42 corresponds to the sub-segments 32a, 34a, 36a, 38a, 40a and 42a of a digital image source 44 respectively. The sub-segments are sets of the pixels located in the same horizontal direction. There are two bits in each one of the fields of sub-segment; all contents are 01 except 00 in the $38^{th}$ field of sub-segment. Therefore, the scaling module 24 deletes the sub-segment 38a of the digital image source 44 according to the content in the field of the $38^{th}$ sub-segment in the LUT, keeps other sub-segments the same, and outputting a processed digital image 45. Repeating the same way on other successive segments, size of the processed digital image 45 is $$\frac{5}{6}$$

of the digital image source 44 in the vertical direction.

Figure 5:
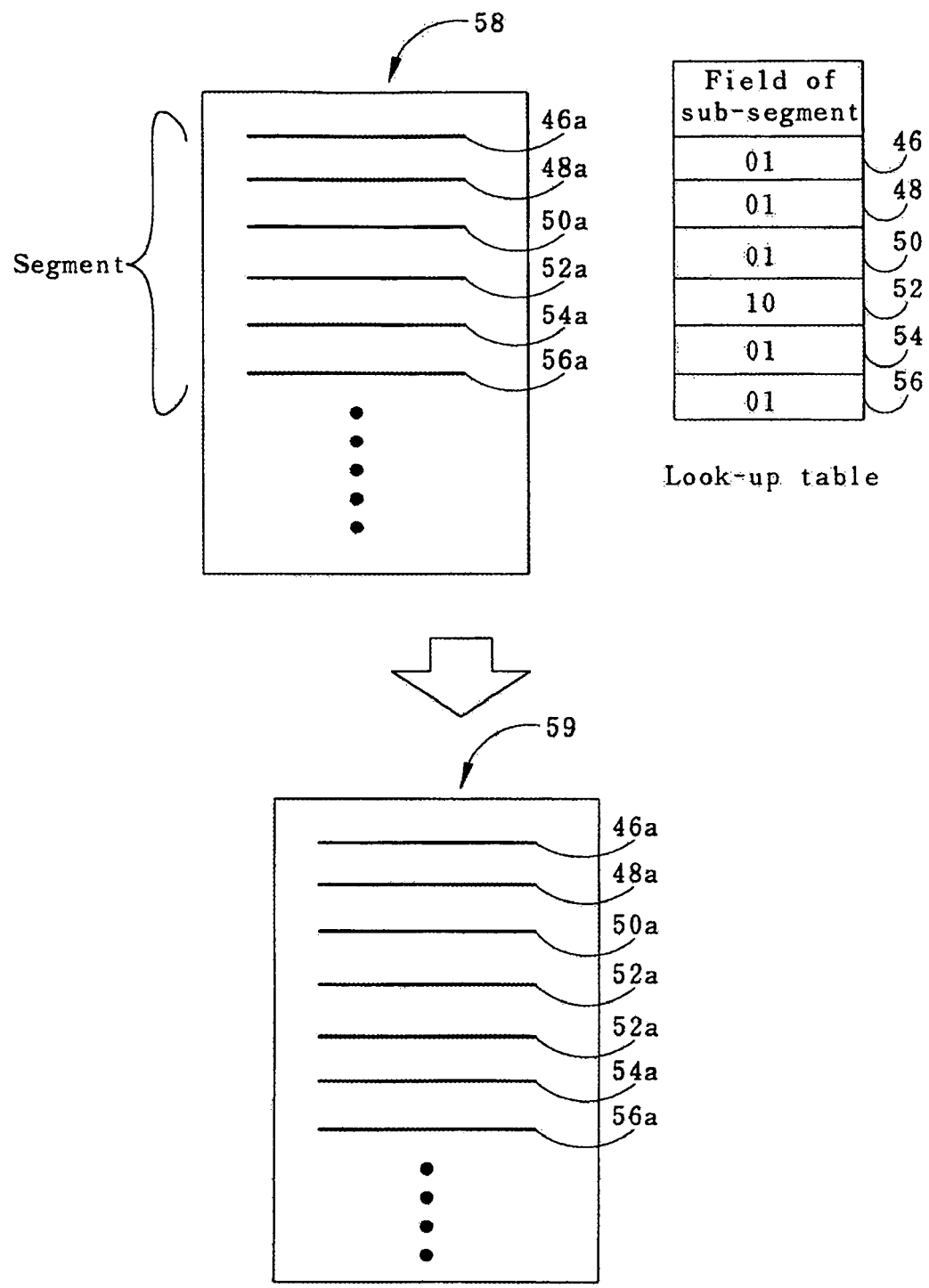
FIG. 5 is a schematic diagram of magnifying an image.

Referring to FIG. 5, it is a schematic diagram of magnifying an image. When information of the scaling ratio of the ratio signal 26 is $$\frac{7}{6}$$

received by the ratio transformation module 22, the LUT generated in accordance with the scaling ratio and stored in the ratio transformation module 22. The process was described as above, therefore no longer gives unnecessary detail in this. The LUT comprises six fields of sub-segments 46, 48, 50, 52, 54 and 56 corresponds to the sub-segments 46a, 48a, 50a, 52a, 54a and 56a of a digital image source 58 respectively. The sub-segments are sets of the pixels located in the same horizontal direction. There are two bits in each one of the fields of sub-segment; all contents are 01 except 10 in the $52^{th}$ field of sub-segment. Therefore, the scaling module 24 duplicates the sub-segment 52a of the digital image source 58 according to the content in the field of the $52^{th}$ sub-segment in the LUT, places the duplicate followed the $52^{th}$ sub-segment, then keeps other sub-segments the same, and outputting a processed digital image 45. Repeating the same way on other successive segments, size of the processed digital image 59 is $$\frac{7}{6}$$

of the digital image source 58 in the vertical direction.

Figure 6:
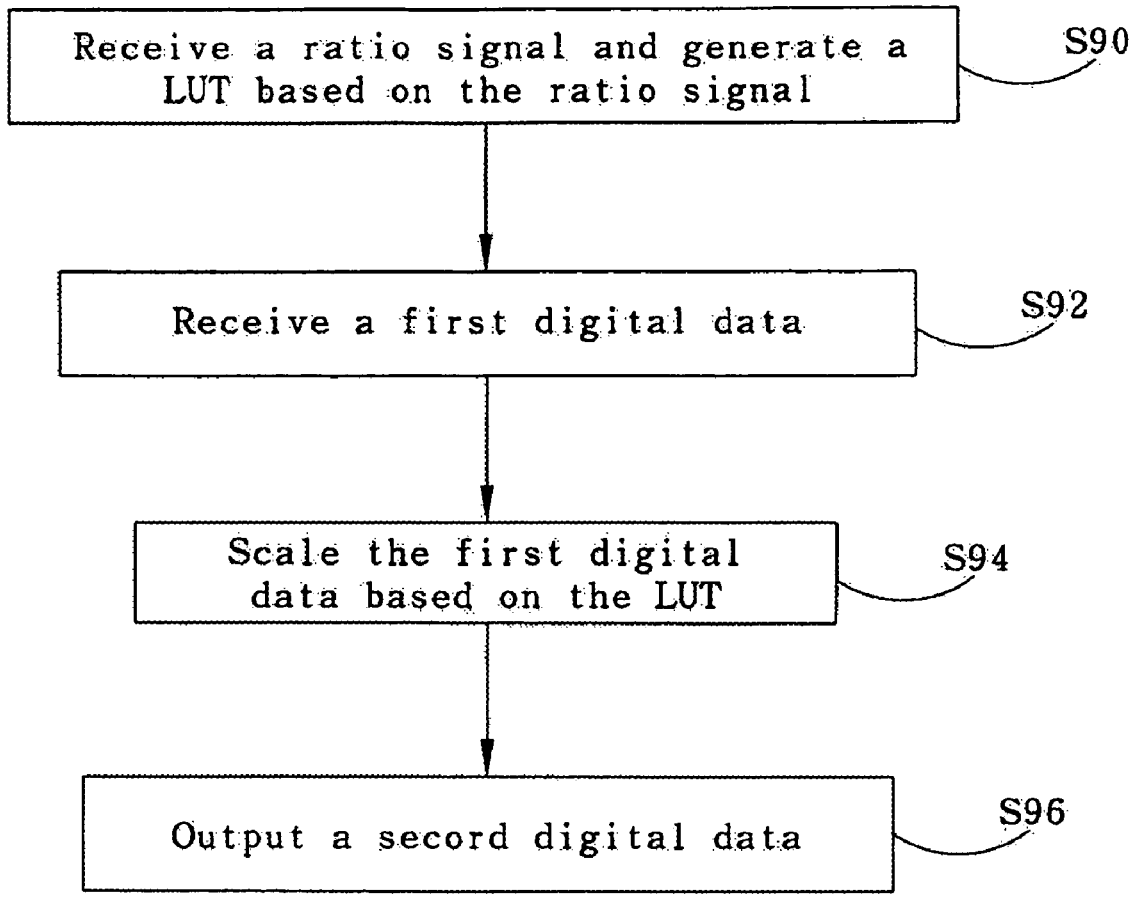
FIG. 6 is a flowchart of data processing method according to this invention.

Referring to FIG. 6, it is a flowchart of data processing method according to this invention. This invention provides a method for generating a LUT according to a ratio signal and scaling a first digital data based on the LUT. This invention comprises the steps of:

Step S90: receiving a ratio signal and generating a LUT based on the ratio signal.

Step S92: receiving a first digital data.

Step S94: scaling the first digital data based on the LUT.

Step S96: outputting a second digital data.

Figure 7:
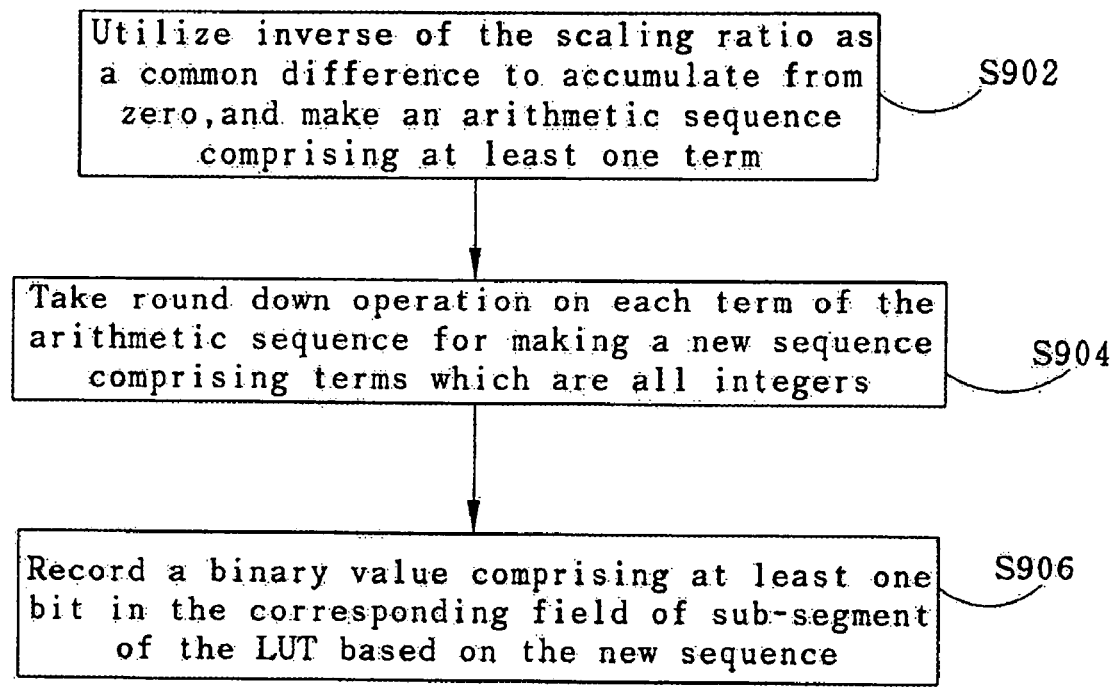
FIG. 7 is a flowchart of S90 shown in FIG. 6.

Referring to FIG. 7, it is a flowchart of S90 shown in FIG. 6. In Step S90, receiving a ratio signal comprising a scaling ratio and processing the following steps according to the scaling ratio:

Step 902: utilizing inverse of the scaling ratio as a common difference to accumulate from zero and making an arithmetic sequence comprising at least one term.

Step 904: taking round down operation on each term of the arithmetic sequence for a new sequence comprising terms which are all integers.

Step 906: recording a binary value comprising at least one bit in the corresponding field of sub-segment of the LUT based on the new sequence.

In the step 904, there are many methods to changes the arithmetic sequence except the round down operation, such as round up operation, gauss operation, etc.

Figure 8:
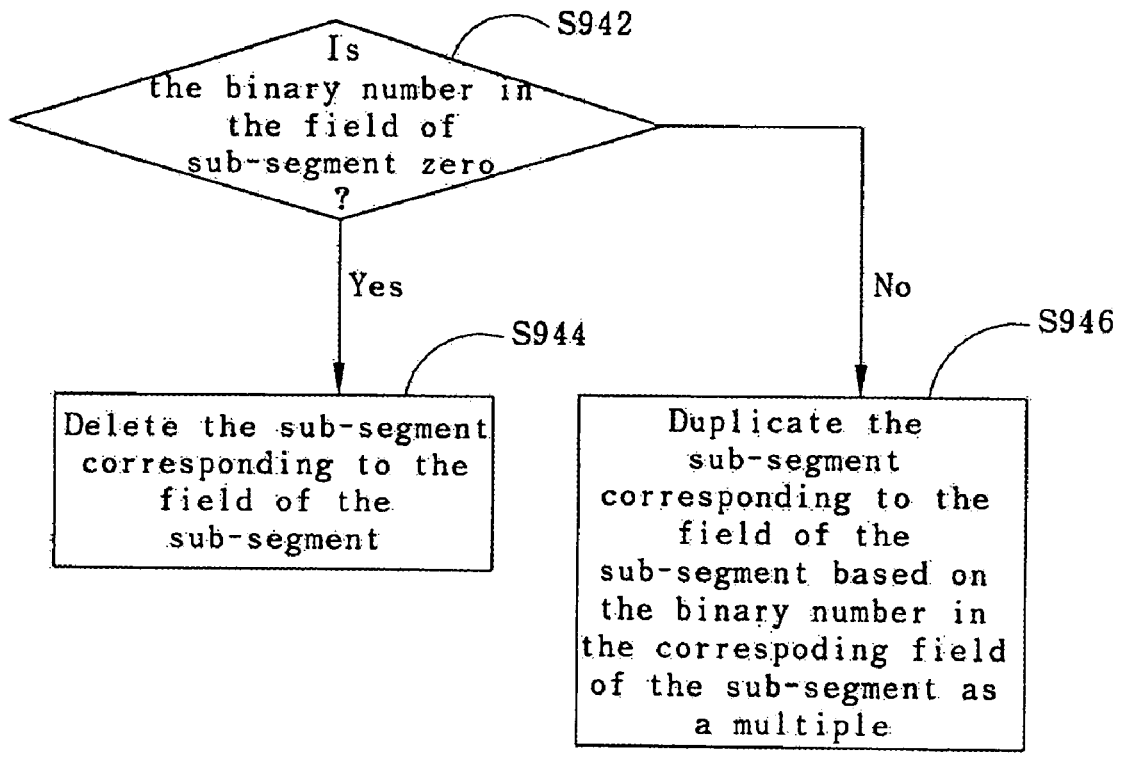
FIG. 8 is a flowchart of S94 shown in FIG. 6.

Referring to FIG. 8, it is a flowchart of S94 shown in FIG. 6. In the step S94, scaling the first digital data based on the content in field of sub-segment of the LUT and processing the following steps:

Step S942: whether the value of the binary number in the field of sub-segment is zero or not; if yes, processing step S944, or processing step S946.

Step S944: deleting the sub-segment corresponding to the field of the sub-segment.

Step S946: duplicating the sub-segment corresponding to the field of the sub-segment based on value of binary number in the corresponding field of the sub-segment as a multiple.

This invention provides an apparatus and a method for scaling a digital data by calculating an arithmetic sequence to generate a LUT according to a ratio signal, duplicating or deleting the sub-segment of the digital data based on the content of the LUT. Comparing to traditional method, such as interpolation, extrapolation, this invention saves operation time, complicated hardware and circuit, also provides simplification, and efficiency.

Finally, those skilled in the art should appreciate that they can readily use the disclosed conception and specific embodiment as a basis for designing or modify other structures for carrying put the same purpose of the present invention without departing from the spirit and scope of the invention as defined by the appended claims.

What is claimed is:

1. A data processing apparatus for scaling a first digital data comprising:
   a ratio transformation module for receiving a ratio signal and generating a Look-up Table (LUT) based on the ratio signal; and
   a scaling module connected to the ratio transformation module for receiving and scaling the first digital data based on the LUT, and outputting a second digital data, wherein the first and second digital data are used to represent digital image.

2. The data processing apparatus of claim 1, wherein the scaling module is capable of dividing the first digital data into at least one segment and each segment comprises at least one sub-segment.

3. The data processing apparatus of claim 2, wherein the LUT corresponds to each one of the segments, and the LUT comprising at least one field of sub-segment, and wherein each one of the fields of sub-segment corresponds to each one of the sub-segments.

4. The data processing apparatus of claim 3, wherein each one of the fields of sub-segment of the LUT comprises at least one bit for representing binary number.

5. The data processing apparatus of claim 4, wherein the ratio transformation module obtains a scaling ratio from the ratio signal and utilizes inverse of the scaling ratio as common difference to make an Arithmetic Sequence including zero.

6. The data processing apparatus of claim 5, wherein the ratio transformation module reduces each term of the Arithmetic Sequence with a rule and writes binary value according to each reduced term into each field of sub-segment corresponding to each reduced term.

7. The data processing apparatus of claim 6, the rule is selected from a group consisting of: Round Up operation, Round Down operation, or Round Off operation.

8. The data processing apparatus of claim 4, wherein the scaling module deletes the sub-segments of the first digital corresponding to the sub-segment of the LUT when the value of field of sub-segment equals zero.

9. The data processing apparatus of claim 4, wherein the scaling module keeps the sub-segments of the first digital corresponding to the sub-segment of the LUT when the value of field of sub-segment equals to one.

10. The data processing apparatus of claim 4, wherein the scaling module duplicates the sub-segments of the first digital corresponding to the sub-segment of the LUT with the value of field of sub-segment when the value of field of sub-segment greater than one.

11. The data processing apparatus of claim 3, wherein the scaling module handles the sub-segment of the first digital data corresponding to the field of sub-segment of the LUT and outputs the second digital data.

12. A data processing method for scaling a first digital data, comprising:
receiving a ratio signal and generating a Look-up Table (LUT) based on the ratio signal; and
receiving and scaling the first digital data based on the LUT, and outputting a second digital data, wherein the first and second digital data are used to represent digital image.

13. The data processing method of claim 12, further comprising dividing the first digital data into at least one segment and each segment comprising at least one sub-segment.

14. The data processing method of claim 13, wherein the LUT corresponds to each one of the segments, and the LUT comprising at least one field of sub-segment, and wherein each one of the fields of sub-segment corresponds to each one of the sub-segments.

15. The data processing method of claim 14, further comprising obtaining a scaling ratio from the ratio signal and utilizing inverse of the scaling ratio as common difference to make an Arithmetic Sequence including zero.

16. The data processing method of claim 15, further comprising reducing each term of the Arithmetic Sequence with a rule and writing binary value according to each reduced term into each field of sub-segment corresponding to each reduced term.

17. The data processing method of claim 16, wherein the rule is selected from a group consisting of: Round Up operation, Round Down operation, or Round Off operation.

18. The data processing method of claim 16, further comprising deleting the sub-segment of the first digital corresponding to the sub-segment of the LUT when the value of field of sub-segment equals to zero.

19. The data processing method of claim 16, further comprising duplicating the sub-segments of the first digital corresponding to the sub-segment of the LUT with the value of field of sub-segment when the value of field of sub-segment greater or equals to one.

20. The data processing method of claim 14, further comprising handling the sub-segment of the first digital data corresponding to the field of sub-segment of the LUT and outputting the second digital data.

* * * * *